United States Patent
Chen (10) Patent No.: US 10,495,754 B2
(45) Date of Patent: Dec. 3, 2019

(54) METHOD, APPARATUS, STORAGE MEDIUM AND PROGRAM PRODUCT FOR SIDE VEHICLE POSITIONING

(71) Applicants: NEUSOFT CORPORATION, Shenyang (CN); NEUSOFT REACH AUTOMOTIVE TECHNOLOGY (SHANGHAI) CO., LTD., Shanghai (CN)

(72) Inventor: Yijun Chen, Shenyang (CN)

(*) Notice: Subject to any disclaimer, the term of this patent is extended or adjusted under 35 U.S.C. 154(b) by 0 days.

(21) Appl. No.: 15/710,817

(22) Filed: Sep. 20, 2017

(65) Prior Publication Data

US 2019/0041513 A1 Feb. 7, 2019

(30) Foreign Application Priority Data

Aug. 3, 2017 (CN) .......................... 2017 1 0657698

(51) Int. Cl.
*B60R 11/04* (2006.01)
*G01S 13/93* (2006.01)
(Continued)

(52) U.S. Cl.
CPC .............. *G01S 13/931* (2013.01); *B60R 1/00* (2013.01); *B60R 11/04* (2013.01); *G08G 1/167* (2013.01);
(Continued)

(58) Field of Classification Search
None
See application file for complete search history.

(56) References Cited

U.S. PATENT DOCUMENTS

2003/0197660 A1* 10/2003 Takahashi .......... G06K 9/00791
345/7
2010/0245579 A1 9/2010 Hongo
(Continued)

FOREIGN PATENT DOCUMENTS

CN 103247030 A 8/2013
CN 103413300 A 11/2013
(Continued)

OTHER PUBLICATIONS

JP First Office Action dated Nov. 27, 2018 in the corresponding JP application (application No. 2017-197902).
(Continued)

*Primary Examiner* — John F Mortell
(74) *Attorney, Agent, or Firm* — Kilpatrick Townsend & Stockton, LLP (57) ABSTRACT

A method and apparatus for side vehicle positioning are provided for positioning a side vehicle accurately. The method includes: converting an original image into an corrected image, the original image being an image shot by an image acquisition device, the corrected image being an image corresponding to the original image under an angle of view of a virtual camera; detecting a wheel feature in a detection region of the corrected image, and acquiring a position of a subimage including the wheel feature in the corrected image; detecting a circle feature in the subimage including the wheel feature, and acquiring a circle detection result, the circle detection result including a position of a circle center of the circle feature in the corrected image and a radius of the circle feature; and acquiring side vehicle positioning information according to the circle detection result.

12 Claims, 7 Drawing Sheets

(51) Int. Cl.
    *B60R 1/00* (2006.01)
    *G08G 1/16* (2006.01)
    *H04N 7/18* (2006.01)
(52) U.S. Cl.
    CPC ........ *H04N 7/183* (2013.01); *B60R 2300/202* (2013.01); *B60R 2300/307* (2013.01); *B60R 2300/60* (2013.01); *B60R 2300/802* (2013.01); *B60T 2201/089* (2013.01); *G01S 2013/9332* (2013.01); *G06T 2207/30252* (2013.01)

(56) References Cited

U.S. PATENT DOCUMENTS

| | | | |
|---|---|---|---|
| 2015/0103159 A1* | 4/2015 | Shashua | G06K 9/00798 348/118 |
| 2016/0073062 A1 | 3/2016 | Ohsugi | |
| 2017/0345310 A1* | 11/2017 | Yoon | H04W 4/70 |

FOREIGN PATENT DOCUMENTS

| | | |
|---|---|---|
| CN | 103832380 A | 6/2014 |
| CN | 105405319 A | 3/2016 |
| CN | 105711501 A | 6/2016 |
| DE | 102014012285 A1 | 2/2016 |
| DE | 102016104021 A1 | 9/2017 |
| JP | 2016062285 A | 4/2016 |
| WO | 2015197237 A1 | 12/2015 |

OTHER PUBLICATIONS

Kenichi Hirose et al., "Accurate Estimation of Wheel Center Points for Estimate of Vehicle Baseline Length in a Circular Fisheye Image", Proceedings of the Fourth International Conference on Innovative Computing, Information and Control, IEEE, pp. 306 to 309, in 2009.

German First Office Action dated Oct. 17, 2018 in the corresponding German application (application No. 102017123515.9).

CN First Office Action dated Jul. 8, 2019 in the corresponding CN application (application No. 201710657698.8).

* cited by examiner

METHOD, APPARATUS, STORAGE MEDIUM AND PROGRAM PRODUCT FOR SIDE VEHICLE POSITIONING

CROSS REFERENCE TO RELATED APPLICATIONS

The present application claims the priority to Chinese Patent Application No. 201710657698.8, entitled "METHOD, APPARATUS, STORAGE MEDIUM AND PROGRAM PRODUCT FOR SIDE VEHICLE POSITIONING", filed on Aug. 3, 2017 with the State Intellectual Property Office of People's Republic of China, which is incorporated herein by reference in its entirety.

TECHNICAL FIELD

The present disclosure relates to the technical field of vehicle controlling, in particular, to a method, an apparatus, a storage medium and a computer program product for side vehicle positioning.

BACKGROUND

For driver assistance systems, accurate side vehicle positioning is critical for correct warning. For example, a position of a vehicle in a side blind spot may be detected in real time by a blind spot detection system. When there is a vehicle in the blind spot, if a turn signal lamp is turned on, the system may warn the driver in light, sound, vibration or other forms, so as to ensure drive security. For another example, when a vehicle at either side changes lanes to cut in, the accurate determination by a forward anti-collision system whether the cut-in vehicle occupies a region in front of the vehicle where the system is installed is critical for determining whether to warn or not. Both of the above functions require acquiring a relative position relationship between the vehicles at either side and the vehicle with the system.

In conventional technologies, methods for achieving side vehicle positioning may be roughly grouped into two categories. One category is dual camera method, namely, installing two cameras at the front or the rear of a vehicle, and optical centers of the two cameras are in parallel. A three-dimensional position of a feature point can be calculated from a relationship between positions of the point in two images, so as to achieve side vehicle positioning. However, the method requires high installation accuracy of the two cameras, resulting in a high cost. The other category is single camera method. For example, through a fish-eye camera installed at the front or the rear of a vehicle, a vehicle feature is used to recognize a rough position of other vehicles. The method has a low cost, and low positioning accuracy for other vehicles.

SUMMARY

In view of the above, a method, an apparatus, a storage medium and a computer program product are provided according to the present disclosure, to address technical issues that side vehicle positioning accuracy with a single camera is low in conventional technologies.

To address the above issues, following technical solutions are provided according the present disclosure.

A method for side vehicle positioning is provided, including:

converting an original image into a corrected image, where the original image is an image shot by an image acquisition device, and the corrected image is an image under an angle of view of a virtual camera which corresponds to the original image;

detecting a wheel feature in a detection region of the corrected image to acquire a position of a subimage in the corrected image, the subimage including the wheel feature;

detecting a circle feature in the subimage including the wheel feature to acquire a circle detection result, where the circle detection result includes a position of a center of the circle feature in the corrected image and a radius of the circle feature; and acquiring side vehicle positioning information according to the circle detection result.

Correspondingly, the method further includes:

acquiring the side vehicle positioning information according to multiple frames of original images respectively, tracking a side vehicle according to the side vehicle positioning information, and acquiring a relative velocity between a present vehicle and the side vehicle.

Correspondingly, converting the original image into the corrected image, includes:

establishing a bijective mapping relationship between positions of pixels in the corrected image and positions of pixels in the original image; and mapping the original image as the corrected image according to the mapping relationship.

Correspondingly, the image acquisition device is a fish-eye camera, and establishing the bijective mapping relationship between the positions of the pixels in the corrected image and the positions of the pixels in the original image, includes:

calculating first mapping positions in a coordinate system where the virtual camera is located for the positions of the pixels in the corrected image, according to a mapping relationship between an image coordinate system used by the corrected image and the coordinate system where the virtual camera is located;

calculating second mapping positions in a world coordinate system for the positions of the pixels in the corrected image, according to the first mapping positions and a mapping relationship between the coordinate system where the virtual camera is located and the world coordinate system;

calculating third mapping positions in a coordinate system where the fish-eye camera is located for the positions of the pixels in the corrected image, according to the second mapping positions and a mapping relationship between the world coordinate system and the coordinate system where the fish-eye camera is located;

calculating fourth mapping positions in an image coordinate system used by the original image for the positions of the pixels in the corrected image, according to the third mapping positions and a distortion parameter of the fish-eye camera; and establishing the bijective mapping relationship between the positions of the pixels in the corrected image and the positions of the pixels in the original image, according to the fourth mapping positions in the image coordinate system used by the original image calculated for the positions of the pixels in the corrected image.

Correspondingly, detecting the wheel feature in the detection region of the corrected image to acquire the position of the subimage including the wheel feature in the corrected image, includes:

mapping a position of a predetermined region in a side lane into the corrected image to acquire detection regions of the corrected image;

moving detection boxes in the detection regions of the corrected image, detecting the wheel feature in the detection boxes with a pre-trained wheel classifier, and setting a detection box image including the wheel feature as the subimage including the wheel feature; and acquiring the position of the subimage including the wheel feature in the corrected image.

Correspondingly, detecting the circle feature in the subimage including the wheel feature to acquire the circle detection result, includes:

converting the subimage including the wheel feature into a grayscale image and performing Sobel filtering to acquire gradients of the grayscale image in a horizontal coordinate axis direction and a vertical coordinate axis direction;

acquiring coordinate points in the grayscale image and calculating gradient directions of the coordinate points, where gradients of the coordinate points in the horizontal coordinate axis direction and the vertical coordinate axis direction satisfy a predetermined condition;

calculating, along the gradient directions of the coordinate points satisfying the predetermined condition, coordinates of projection circle centers corresponding to different predetermined radii respectively; and selecting coordinates of a projection circle center with maximum occurrence times to be converted into the position of the center of the circle feature in the corrected image, and setting a predetermined radius corresponding to the coordinates of the projection circle center with maximum occurrence times, as the radius of the circle feature.

Correspondingly, acquiring side vehicle positioning information according to the circle detection result, includes:

merging a plurality of circle detection results, mapping the position of the center of the circle feature of the merged circle detection result in the corrected image into a world coordinate system to acquire the side vehicle positioning information.

An apparatus for side vehicle positioning is provided, including:

a conversion unit, configured to convert an original image into a corrected image, where the original image is an image shot by an image acquisition device, and the corrected image is an image under an angle of view of a virtual camera which corresponds to the original image;

a first detection unit, configured to detect a wheel feature in a detection region of the corrected image to acquire a position of a subimage in the corrected image, the subimage including the wheel feature;

a second detection unit, configured to detect a circle feature in the subimage including the wheel feature to acquire a circle detection result, where the circle detection result includes a position of a center of the circle feature in the corrected image, and a radius of the circle feature; and an acquisition unit, configured to acquire side vehicle positioning information according to the circle detection result.

Correspondingly, the apparatus further includes:

a tracking unit, configured to acquire the side vehicle positioning information according to multiple frames of original images respectively, track a side vehicle according to the side vehicle positioning information, and acquire a relative velocity between a present vehicle and the side vehicle.

Correspondingly, the conversion unit includes:

a first establishment subunit, configured to establish a bijective mapping relationship between positions of pixels in the corrected image and positions of pixels in the original image; and a first mapping subunit, configured to map the original image as the corrected image according to the mapping relationship.

Correspondingly, the image acquisition device is a fish-eye camera, and the first establishment subunit includes:

a first calculation subunit, configured to calculate first mapping positions in a coordinate system where the virtual camera is located for the positions of the pixels in the corrected image, according to a mapping relationship between an image coordinate system used by the corrected image and the coordinate system where the virtual camera is located;

a second calculation subunit, configured to calculate second mapping positions in a world coordinate system for the positions of the pixels in the corrected image, according to the first mapping positions and a mapping relationship between the coordinate system where the virtual camera is located and the world coordinate system;

a third calculation subunit, configured to calculate third mapping positions in a coordinate system where the fish-eye camera is located for the positions of the pixels in the corrected image, according to the second mapping positions and a mapping relationship between the world coordinate system and the coordinate system where the fish-eye camera is located;

a fourth calculation subunit, configured to calculate fourth mapping positions in an image coordinate system used by the original image for the positions of the pixels in the corrected image, according to the third mapping positions and a distortion parameter of the fish-eye camera; and a second establishment subunit, configured to establish the bijective mapping relationship between the positions of the pixels in the corrected image and the positions of the pixels in the original image, according to the fourth mapping positions in the image coordinate system used by the original image calculated for the positions of the pixels in the corrected image.

Correspondingly, the first detection unit includes:

a second mapping subunit, configured to map a position of a predetermined region in a side lane into the corrected image to acquire detection regions of the corrected image;

a detection subunit, configured to move detection boxes in the detection regions of the corrected image, detect the wheel feature in the detection boxes with a pre-trained wheel classifier, and set a detection box image including the wheel feature as the subimage including the wheel feature; and an acquisition subunit, configured to acquire the position, of the subimage including the wheel feature, in the corrected image.

Correspondingly, the second detection unit includes:

a conversion subunit, configured to convert the subimage including the wheel feature into a grayscale image and perform Sobel filtering to acquire gradients of the grayscale image in a horizontal coordinate axis direction and a vertical coordinate axis direction;

a fifth calculation subunit, configured to acquire coordinate points in the grayscale image and calculate gradient directions of the coordinate points, where gradients of the coordinate points in the horizontal coordinate axis direction and the vertical coordinate axis direction satisfy a predetermined condition;

a sixth calculation subunit, configured to calculate, along the gradient directions of the coordinate points satisfying the predetermined condition, coordinates of projection circle centers corresponding to different predetermined radii respectively; and a selection subunit, configured to select coordinates of a projection circle center with maximum occurrence times to be converted into the position of the center of the circle feature in the corrected image, and set a predetermined radius corresponding to the coordinates of the projection circle center with maximum occurrence times, as the radius of the circle feature.

Correspondingly, the acquisition unit is configured to:

merge a plurality of circle detection results, map the position of the center of the circle feature of the merged circle detection result in the corrected image into a world coordinate system to acquire the side vehicle positioning information.

A computer readable storage medium is provided. The computer readable storage medium stores instructions that, when executed by a terminal device, configure the terminal device to execute the method for side vehicle positioning.

A computer program product is provided. When executed by a terminal device, the computer program product configures the terminal device to execute the method for side vehicle positioning.

From the above, it is seen that following benefits are provided by embodiments of the present disclosure.

According to embodiments of the present disclosure, the original image shot by the image acquisition device is converted into the planar corrected image first. As a wheel in the converted corrected image is close to a perfect circle, it may detect the wheel feature in the corrected image, and then detect the circle feature in the wheel feature. Other vehicles at the sides are accurately positioned through detection of the explicit circle feature, thereby increasing accuracy of side vehicle positioning by a single camera.

DETAILED DESCRIPTION OF THE EMBODIMENTS

For a better understanding and clearance of the above objectives, characteristics and merits of the present disclosure, hereinafter embodiments of the present disclosure are further illustrated in detail, in conjunction with drawings and specific implementations.

In conventional technologies, side vehicle positioning by a single camera (such as a fish-eye camera) can only detect a rough position of another vehicle through a vehicle feature, but cannot detect a precise feature, resulting in low accuracy of side vehicle positioning. To address the issue, according to an embodiment of the present disclosure, first virtual camera technology is used to convert an original image acquired by an image acquisition device into a corrected image, where the corrected image may be understood as a planar image at a left side and/or a right side. An approximate position of a wheel is detected by recognizing a wheel feature in the corrected image, an accurate position of the wheel is determined through a circle detection in a positioned wheel region, and thereby a position of a side vehicle is calculated. Additionally, error recognition can be eliminated through tracking a circle feature. Through recognition of the precise feature, a method for achieving side vehicle positioning, provided according to embodiments of the present disclosure, can acquire a position relationship between the vehicle and a side vehicle accurately.

Figure 1:
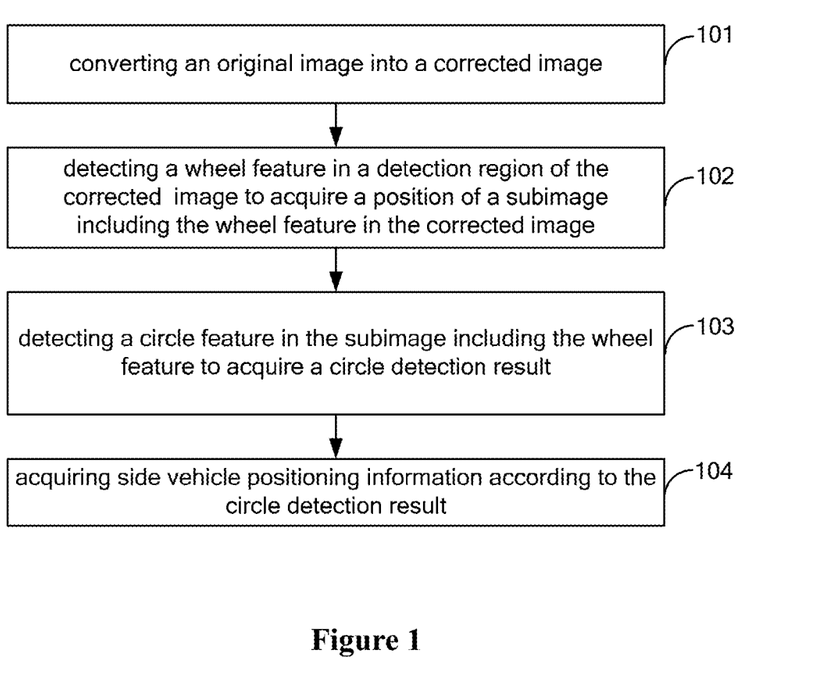
FIG. 1 is a flowchart of a method for side vehicle positioning according to an embodiment of the present disclosure.

Reference is made to FIG. 1, which shows a flowchart of a method for side vehicle positioning provided according to an embodiment of the present disclosure. The embodiment includes steps 101 to 104.

At step 101, an original image is converted into a corrected image. The original image is an image shot by an image acquisition device, and the corrected image is an image corresponding to the original image under an angle of view of a virtual camera.

The image acquisition device may be installed on a vehicle, and shoots an image in front or rear of the vehicle. The image shot by the image acquisition device may serve as the original image. The original image may be used to position a side vehicle according to the present disclosure, also may be used to achieve other detection functions on the vehicle, which is not limited by the present disclosure. The image acquisition device may be a wide angle image acquisition device such as a fish-eye camera, also may be an image acquisition device of any other type.

Due to a possible distortion of the image shot in wide angle by the image acquisition device, there is a deformation of the side vehicle shot in the original image, and some certain features in the original image cannot be detected directly. Therefore, the original image needs to be converted into the corrected image. The corrected image may be the image corresponding to the original image under the angle of view of the virtual camera.

Figure 2:
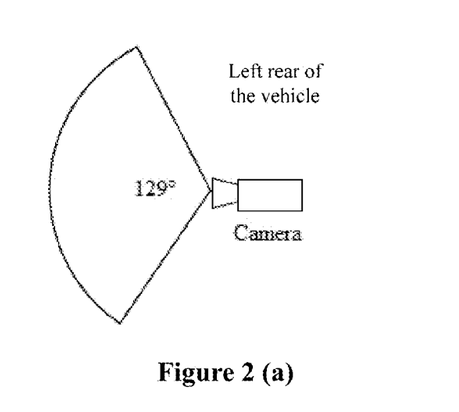
FIG. 2(a) is a schematic diagram of an angle of view of a virtual camera according to an embodiment of the present disclosure.
FIG. 2(b) is a schematic diagram of an angle of view of a virtual camera according to an embodiment of the present disclosure.

The angle of view of the virtual camera is shown in FIG. 2. FIG. 2(a) is an angle of view of a left virtual camera, and FIG. 2(b) is an angle of view of a right virtual camera. Assuming the angle of view of the image acquisition device is fixed to shoot front or rear of the vehicle, the angle of view of the virtual camera may be understood as follows: the angle of view of the image acquisition device is virtualized as angles of view of virtual cameras and, under the angle of view of one of the virtual cameras, one side of the vehicle is shot. Thus, the angle of view of the left virtual camera may be understood as follows: the angle of view of the image acquisition device is virtualized to get the angle of view of the left virtual camera under which the left side of the vehicle is shot with the virtual camera. The angle of view of the right virtual camera may be understood as follows: the angle of view of the image acquisition device is virtualized to get the angle of view of the right virtual camera under which the right side of the vehicle is shot with the virtual camera.

The process of converting the original image into the corrected image may be understood as converting, through virtual camera technology, the original image shot in wide angle in front or rear of the vehicle, into a planar image shot for a side of the vehicle.

In a practical application, the original image may be converted into the corrected images of the left side and the right side of the vehicle, also may be converted into the corrected image of either side of the vehicle. A conversion process may be performed based on configurations of the virtual camera.

At step 102, it is to detect a wheel feature in a detection region of the corrected image to acquire a position of a subimage including the wheel feature, in the corrected image.

The side-front and side-rear of the vehicle are critical regions to detect whether, at sides of the vehicle, there exists another vehicle. A position of a predetermined region in a side lane may be mapped into the corrected image to acquire detection region in the corrected image. There may be a plurality of the predetermined regions in a side lane, and there may be a plurality of detection regions in the corrected image.

In a practical application, a detection box may be moved in each detection region with a predetermined step-size, and the size of the detection box may be predetermined. Then, a trained wheel classifier may be employed to detect whether the detection box includes the wheel feature, thereby acquiring a detection box image including the wheel feature as the subimage including the wheel feature, and acquiring the position of the subimage including the wheel feature, in the corrected image.

At step 103, it is to detect a circle feature in the subimage including the wheel feature to acquire a circle detection result. The circle detection result includes a position of the center of the circle feature in the corrected image, and a radius of the circle feature.

The circle feature is further detected in the wheel feature, thereby determining the position of the side vehicle accurately through the position of the center and the radius of the circle feature.

At step 104: side vehicle positioning information is acquired according to the circle detection result.

In the embodiment, detection of the circle feature is performed on each subimage of the wheel feature, and a plurality of circle detection results corresponding to a same circle may be obtained. Thus, the plurality of the circle detection results can be merged, and the circle feature in the merged circle detection result is finally used to position the side vehicle. In some possible implementations of the present disclosure, the position of the center of the circle feature of the merged circle detection result in the corrected image may be mapped into a world coordinate system, acquiring positioning information of the side vehicle.

Specific implementing processes of the above steps are further illustrated in following embodiments.

In such way, according to the embodiment of the present disclosure, the original image with a distortion, shot by the fish-eye camera, is converted into the planar corrected image first. As the wheel in the converted corrected image is close to a perfect circle, the wheel feature may be detected in the corrected image, then the circle feature is detected in the wheel feature. The side vehicle is accurately positioned through detection of the explicit circle feature, thereby increasing accuracy of side vehicle positioning by a single camera.

Hereinafter the implementing process of step 101 is illustrated. For convenience of following illustration, first introduced are a pixel coordinate system, an image coordinate system, a camera coordinate system, a world coordinate system, and conversion relationships among these coordinate systems, involved in the embodiment of the present disclosure. In the embodiment, the fish-eye camera is taken as an example of the image acquisition device for illustration.

Figure 3:
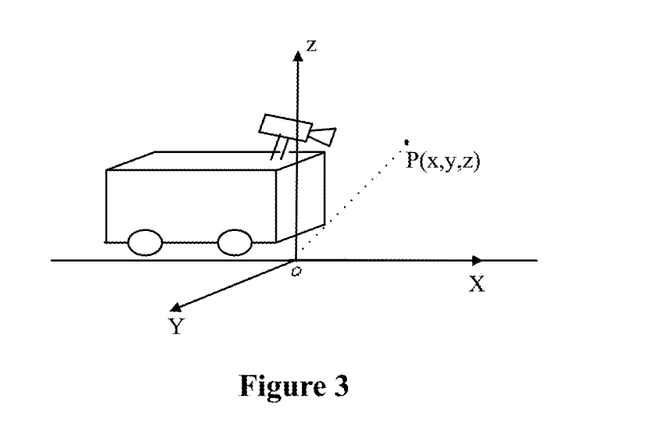
FIG. 3 is a schematic diagram of a world coordinate system according to an embodiment of the present disclosure.

The installation position of the fish-eye camera and the world coordinate system are shown in FIG. 3. Corresponding to a set-to-set relationship in camera imaging, the world coordinate system (O, X, Y, Z) and the pixel coordinate system (u, v) are established.

In a practical application, the origin O of the world coordinate system may be established at the intersection of the vertical center line of the fish-eye camera and the ground, X axis may point forward along the longitudinal axis of the vehicle, Y axis may point rightward perpendicular to the longitudinal axis of the vehicle, and Z axis may point upward perpendicular to the vehicle. A position of an object in the world coordinate system can be identified through its coordinates in the world coordinate system. The unit of the world coordinate system may be meter. When performing following conversion calculations among the coordinate systems, the unit of the coordinates in the world coordinate system may be converted into millimeter for subsequent calculations. Establishment of the world coordinate system may accord to an actual condition, and the position of the origin and the direction of each axis of the word coordinate system are not limited by the present disclosure.

Figure 4:
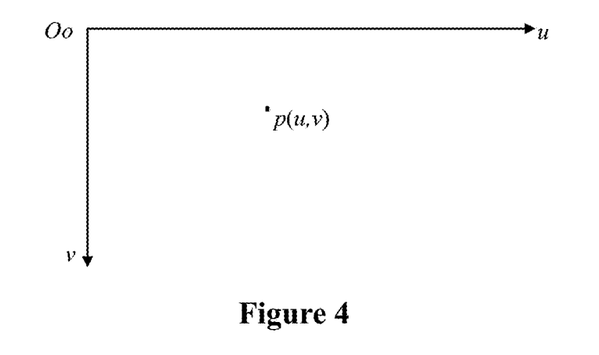
FIG. 4 is a schematic diagram of a pixel coordinate system according to an embodiment of the present disclosure.

Reference is made to FIG. 4, where the origin Oo of the pixel coordinate system (u, v) may be established at the upper left corner of an image, and the horizontal coordinate u and the vertical coordinate v may correspond to the row and the column in the image, respectively. The pixel coordinate system may represent physical positions in a camera photosensitive component, and the unit of the pixel coordinate system may be millimeter.

Figure 5:
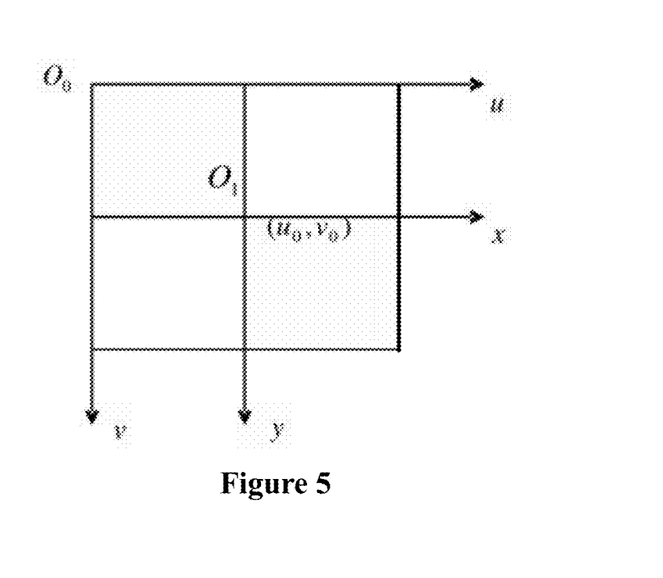
FIG. 5 is a schematic diagram of an image coordinate system according to an embodiment of the present disclosure.

Reference is made to FIG. 5, where the origin O1 of the image coordinate system (x, y) may be the center point of pixel coordinates, and the horizontal coordinate x and the vertical coordinate y may correspond to the row and the column of the image, respectively. The image coordinate system may correspond to pixel positions in the image, and the unit may be pixel.

Assuming (u0, v0) represents coordinates of the origin O1 of the image coordinate system in the pixel coordinate system, and dx and dy represent physical sizes of each pixel on the horizontal axis x and the vertical axis y, the relationship between the image coordinate system and the pixel coordinate system is $$u = \frac{x}{d_x} + u_0, \; v = \frac{y}{d_y} + v_0,$$

where (u0, v0) is the physical center of the camera photosensitive component. Assuming the unit of the pixel coordinate system is millimeter, the unit of dx is millimeter/pixel. The unit of x/dx is pixel, compatible with the unit of the pixel coordinate system.

According to the above equation, a conversion relationship between coordinates (x, y) in the image coordinate system and coordinates (u, v) in the pixel coordinate system can be obtained:

$$\begin{bmatrix} u \\ v \\ 1 \end{bmatrix} = \begin{bmatrix} \frac{1}{d_x} & 0 & u_0 \\ 0 & \frac{1}{d_y} & v_0 \\ 0 & 0 & 1 \end{bmatrix} \begin{bmatrix} x \\ y \\ 1 \end{bmatrix} \quad \text{(Equation 1)}$$

According to an inverse of above Equation 1, a conversion relationship between coordinates (u, v) in the pixel coordinate system and coordinates (x, y) in the image coordinate system can be obtained:

$$\begin{bmatrix} x \\ y \\ 1 \end{bmatrix} = \begin{bmatrix} d_x & 0 & -u_0 d_x \\ 0 & d_y & -v_0 d_y \\ 0 & 0 & 1 \end{bmatrix} \begin{bmatrix} u \\ v \\ 1 \end{bmatrix} \quad \text{(Equation 2)}$$

Figure 6:
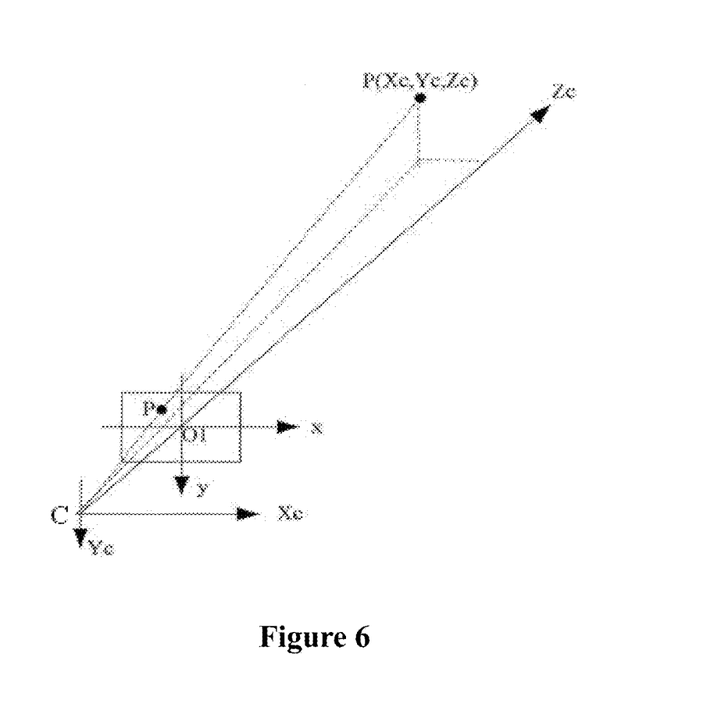
FIG. 6 is a schematic diagram of a camera coordinate system according to an embodiment of the present disclosure.

Reference is made to FIG. 6, which shows a schematic diagram of the camera coordinate system. The origin C of the camera coordinate system is the optical center of the camera, Zc is the optical axis of the camera and perpendicular to the image plane, and O-O$_1$ is the focal length of the camera. In the embodiment, the camera may be the fish-eye camera, the virtual camera, or other image acquisition devices, and the fish-eye camera and the virtual camera may be located in respective camera coordinate systems.

A relationship between the camera coordinate system and the image coordinate system may be $$x = f\frac{X_c}{Z_c}, \; y = f\frac{Y_c}{Z_c},$$

where f is the local length.

According to the above equation, a conversion relationship between coordinates (Xc, Yc, Zc) in the camera coordinate system and coordinates (x, y) in the image coordinate system can be obtained:

$$Z_c \begin{bmatrix} x \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} X_c \\ Y_c \\ Z_c \\ 1 \end{bmatrix} \quad \text{(Equation 3)}$$

According to an inverse of above Equation 3, a conversion relationship between coordinates (x, y) in the image coordinate system and coordinates (Xc, Yc, Zc) in the camera coordinate system can be obtained:

$$\begin{bmatrix} X_c \\ Y_c \\ Z_c \\ 1 \end{bmatrix} = Z_c \begin{bmatrix} \frac{1}{f} & 0 & 0 \\ 0 & \frac{1}{f} & 0 \\ 0 & 0 & 1 \\ 0 & 0 & 0 \end{bmatrix} \begin{bmatrix} x \\ y \\ 1 \end{bmatrix} \quad \text{(Equation 4)}$$

Figure 7:
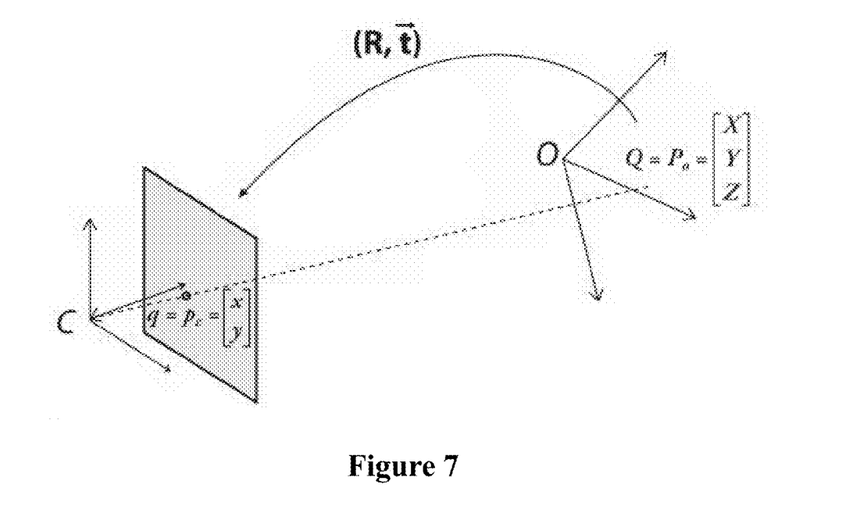
FIG. 7 is a schematic diagram of a relationship between a camera coordinate system and a world coordinate system according to an embodiment of the present disclosure.

The world coordinate system is introduced to describe the position of the camera, as shown in FIG. 7. The camera coordinate system can be mapped into the world coordinate system through rotation and translation, and a rotation of any dimensions can be represented by a product of a coordinate vector and a proper matrix. In the world coordinate system, there are two parameters: a rotation matrix R and a translation vector T. For example, if a coordinate system A can be obtained through a rotation and a translation of another coordinate system B, coordinates in the coordinate system B can be obtained through multiplying corresponding coordinates in the coordinate system A with the rotation matrix R and adding further the translation matrix T. The translation vector T may be an offset between origins of the two coordinate systems.

So a conversion relationship between coordinates (Xw, Yw, Zw) in the word coordinate system and coordinates (Xc, Yc, Zc) in the camera coordinate system is:

$$\begin{bmatrix} X_c \\ Y_c \\ Z_c \end{bmatrix} = (R \mid T) \begin{bmatrix} X_w \\ Y_w \\ Z_w \\ 1 \end{bmatrix} \quad \text{(Equation 5)}$$

Specifically, it is assumed that a space point has coordinates Pc(Xc, Yc, Zc) in the camera coordinate system, and has coordinates P0(Xw, Yw, Zw) in the world coordinate system. It is also assumed that the world coordinate system is obtained by rotating the camera coordinate system $\theta_1$ around X axis, $\theta_2$ around Y axis, and $\theta_3$ around Z axis, then translating T(Xo, Yo, Zo).

So based on space geometry, a conversion relationship between the coordinates (Xc, Yc, Zc) in the camera coordinate system and the coordinates (Xw, Yw, Zw) in the world coordinate system is:

$$\begin{bmatrix} Xw \\ Yw \\ Zw \end{bmatrix} = \begin{bmatrix} \cos\theta_3 & \sin\theta_3 & 0 \\ -\sin\theta_3 & \cos\theta_3 & 0 \\ 0 & 0 & 1 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix} \quad \text{(Equation 6)}$$
$$\begin{bmatrix} 1 & 0 & 0 \\ 0 & \cos\theta_1 & \sin\theta_1 \\ 0 & -\sin\theta_1 & \cos\theta_1 \end{bmatrix} \begin{bmatrix} Xc - Xo \\ Yc - Yo \\ Zc - Zo \end{bmatrix}$$

According to an inverse of above Equation 6, a conversion relationship between the coordinates (Xw, Yw, Zw) in the world coordinate system and the coordinates (Xc, Yc, Zc) in the camera coordinate system can be obtained:

$$\begin{bmatrix} Xc \\ Yc \\ Zc \end{bmatrix} = \begin{bmatrix} \cos\theta_3 & -\sin\theta_3 & 0 \\ \sin\theta_3 & \cos\theta_3 & 0 \\ 0 & 0 & 1 \end{bmatrix} \begin{bmatrix} \cos\theta_2 & 0 & \sin\theta_2 \\ 0 & 1 & 0 \\ -\sin\theta_2 & 0 & \cos\theta_2 \end{bmatrix} \quad \text{(Equation 7)}$$
$$\begin{bmatrix} 1 & 0 & 0 \\ 0 & \cos\theta_1 & -\sin\theta_1 \\ 0 & \sin\theta_1 & \cos\theta_1 \end{bmatrix} \begin{bmatrix} Xw + Xo \\ Yw + Yo \\ Zw + Zo \end{bmatrix}$$

The pixel coordinate system, the image coordinate system, the camera coordinate system, the world coordinate system, and the conversion relationships among these coordinate systems are illustrated above. Hereinafter, the specific implementing process of step 101 is illustrated in conjunction with the above illustration. The implementing process of step 101 may include: establishing a bijective mapping relationship between positions of pixels in the corrected image and positions of pixels in the original image; and mapping the original image as the corrected image according to the mapping relationship.

And establishing the bijective mapping relationship between the positions of the pixels in the corrected image and the positions of the pixels in the original image, includes:

calculating first mapping positions in a coordinate system where the virtual camera is located, for the positions of the pixels in the corrected image, according to a mapping relationship between an image coordinate system used by the corrected image and the coordinate system where the virtual camera is located;

calculating second mapping positions in a world coordinate system, for the positions of the pixels in the corrected image, according to the first mapping positions and a mapping relationship between the coordinate system where the virtual camera is located and the world coordinate system;

calculating third mapping positions in a coordinate system where the fish-eye camera is located, for the pixels in the corrected image, according to the second mapping positions and a mapping relationship between the world coordinate system and the coordinate system where the fish-eye camera is located;

calculating fourth mapping positions in the image coordinate system used by the original image, for the positions of the pixels in the corrected image, according to the third mapping positions and distortion parameters of the fish-eye camera; and establishing the bijective mapping relationship between the positions of the pixels in the corrected image and the positions of the pixels in the original image, according to the fourth mapping positions and the positions of the pixels in the corrected image.

That is to say, assuming the coordinates of a certain point in the original image is P'(X', Y'), and the coordinates of a certain point in the corrected image is P(x, y), and assuming that the focal length of the virtual camera is f=1, Zc=1, above Equation 4 may serve as the mapping relationship between the image coordinate system used by the corrected image and the coordinate system where the virtual camera is located (camera coordinate system). Through Equation 4, the first mapping position Pc(Xc, Yc, Zc) in the coordinate system where the virtual camera is located can be calculated for the pixel position P(x, y) in the corrected image.

Assuming external parameters of the virtual camera are ($\theta_1$, $\theta_2$, $\theta_3$, Xo, Yo, Zo), the above Equation 6 may serve as the mapping relationship between the coordinate system where the virtual camera is located (camera coordinate system) and the world coordinate system. Through Equation 6, the second mapping position Pw(Xw, Yw, Zw) in the world coordinate system can be further calculated for the pixel position P(x, y) in the corrected image. The external parameters of the virtual camera set the rotation matrix and the translation matrix in conversion from the camera coordinate system to the world coordinate system.

Assuming external parameters of the fish-eye camera are $\theta_{1f}$, $\theta_{2f}$, $\theta_{3f}$, Xf, Yf, Zf, the above Equation 7 may serve as the mapping relationship between the world coordinate system and the coordinate system where the fish-eye camera is located (camera coordinate system). Through Equation 7, the third mapping position $P_{fc}(X_{fc}, Y_{fc}, Z_{fc})$ in the coordinate system where the fish-eye camera is located can be further calculated for the pixel position P(x, y) in the corrected image. Similarly, the external parameters of the fish-eye camera set the rotation matrix and the translation matrix in conversion from the camera coordinate system to the world coordinate system, that is to say, $\theta_1$, $\theta_2$, $\theta_3$, Xo, Yo, Zo in Equation 7 can be replaced by the external parameters $\theta_{1f}$, $\theta_{2f}$, $\theta_{3f}$, Xf, Yf, Zf of the fish-eye camera for calculation.

Due to a distortion of the fish-eye camera, the following method is applied to further calculate the fourth mapping position P'(X', Y') in the image coordinate system used by the original image, for the pixel position P(x, y) in the corrected image. Assuming the distortion parameters of the fish-eye camera are $K_1$, $K_2$, $K_3$, $K_4$, $K_5$:

$$t = \operatorname{atan}\left(\sqrt{X_{fc}^2 + Y_{fc}^2}/Z_{fc}\right) \quad \text{(Equation 8)}$$

$$r = K_1 * t + K_2 * t^3 + K_3 * t^5 + K_4 * t^7 + K_5 * t^9 \quad \text{(Equation 9)}$$

$$\theta = \operatorname{atan}(Y_{fc}/X_{fc}) \quad \text{(Equation 10)}$$

$$X' = r * \frac{\cos\theta}{dx} + u_0, \quad Y' = r * \frac{\sin\theta}{dy} + v_0 \quad \text{(Equation 11)}$$

In Equation 11, ($u_0$, $v_0$) is the physical center of the camera photosensitive component. Assuming the unit of the pixel coordinate system is millimeter, so the unit of dx is millimeter/pixel, and the unit of dy is millimeter/pixel, where dx and dy are parameters for unit conversion between the pixel coordinate system and the image coordinate system.

From the above calculation steps, the bijective mapping relationship between the positions of the pixels in the corrected image and the positions of the pixels in the original image is acquired. Namely, according to the position (x, y) of each pixel in the corrected image, the corresponding position (X, Y) of the pixel in the original image can be obtained.

Figure 8:
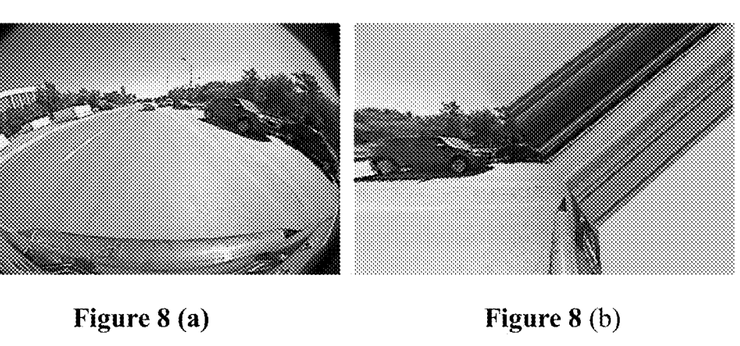
FIG. 8(a) is a schematic diagram of an original image according to an embodiment of the present disclosure.
FIG. 8(b) is a schematic diagram of an corrected image according to an embodiment of the present disclosure.

Then the original image can be mapped as the corrected image according to the bijective mapping relationship between the positions of the pixels in the corrected image and the positions of the pixels in the original image. Reference is made to FIG. 8, where the original image shown in FIG. 8(a) can be mapped as the corrected image shown in FIG. 8(b). It can be seen that, there exists distortion in the original image, and there almost exists no distortion for the side vehicle in the corrected image, and the corrected image can be used for subsequent feature detections.

Figure 9:
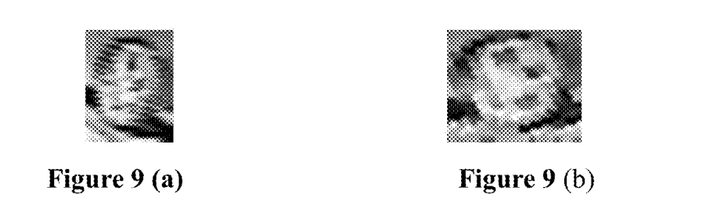
FIG. 9(a) is a schematic diagram of a wheel part in an original image according to an embodiment of the present disclosure.
FIG. 9(b) is a schematic diagram of a wheel part in a corrected image according to an embodiment of the present disclosure.

Reference is made to FIG. 9, where the wheel feature in the original image is elliptical and cannot be used for a circle detection, and the wheel feature in the corrected image is close to perfect circle and can be used for the circle detection.

Hereinafter the implementing process for step 102 is illustrated.

Figure 10:
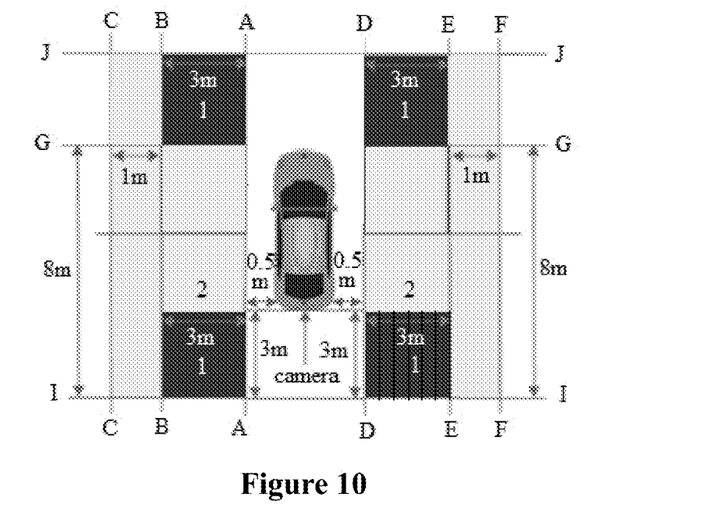
FIG. 10 is a schematic diagram of a predetermined region in a side lane according to an embodiment of the present disclosure.

Reference is made to FIG. 10. In a practical application, four regions of the left front, right front, left rear and right rear of a vehicle are critical regions for detecting whether there are other vehicles at the sides. For example, sizes of the four regions each are 3 m*3 m. Taken the right rear region as an example, the right rear region is divided into 6 sections along a direction parallel to the vehicle, where the distances between the sections and the vehicle are 0.5 m, 1 m, 1.5 m, 2 m, 2.5 m, 3 m, respectively. Predetermined regions in the six planes perpendicular to the ground serve as predetermined regions of a side lane to be detected, and positions of the predetermined regions of the side lane in the world coordinate system are mapped into the image coordinate system of the corrected image, where a mapping process may employ the conversion relationships among the coordinate systems mentioned above.

Then detection boxes are moved in the detection regions of the corrected image, and a pre-trained wheel classifier is used to detect the wheel feature in the detection boxes. A detection box image including the wheel feature is set as the subimage including the wheel feature. And the position of the subimage including the wheel feature in the corrected image is acquired.

Figure 11:
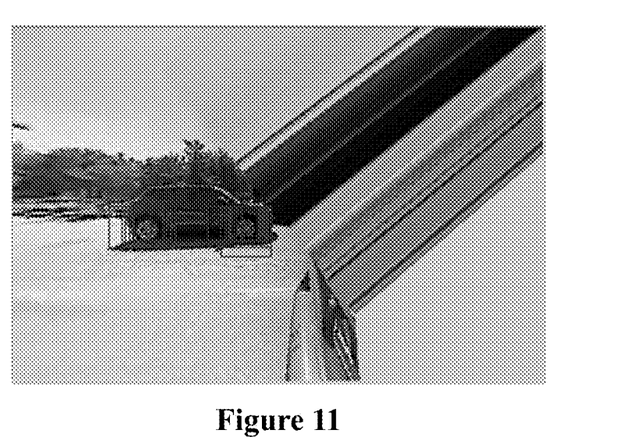
FIG. 11 is a schematic diagram of a wheel feature detection result according to an embodiment of the present disclosure.

Reference is made to FIG. 11, which is a schematic diagram of the subimage including the wheel feature in the corrected image. In a practical application, the acquired vehicle detection result may be saved in a WheelList (wheel list). The vehicle detection result includes a position of the subimage including the wheel feature in the corrected image. As the detection is performed by drawing windows in the detection region, the wheel feature may be detected in a plurality of detection boxes. Thus the WheelList may include a plurality of wheel detection results, and each wheel detection result corresponds to a rect (x, y, width, height), where "width" and "height" may represent a width and a height of the subimage including the wheel feature, respectively, and x, y may represent coordinates in the corrected image, for a certain point (such as an upper left corner) in the subimage including the wheel feature. In a practical application, an upper left corner of the corrected image may be set as (x, y)=(0, 0).

Hereinafter an implementing process for step 103 is illustrated.

In some possible implementations of the embodiment of the present disclosure, detecting the circle feature in the subimage including the wheel feature to acquire the circle detection result may include:

converting the subimage including the wheel feature into a grayscale image and performing Sobel filtering to acquire gradients of the grayscale image in horizontal coordinate axis direction and a vertical coordinate axis direction;

acquiring coordinate points in the grayscale image and calculating gradient directions of the coordinate points, where the gradients of the coordinate points in the horizontal coordinate axis direction and the vertical coordinate axis direction satisfy a predetermined condition;

calculating, along the gradient directions of the coordinate points satisfying the predetermined condition, coordinates of projection circle centers corresponding to different predetermined radii respectively; and selecting coordinates of a projection circle center with maximum occurrence times to be converted into the position of the center of the circle feature in the corrected image, and setting a predetermined radius corresponding to the coordinates of the projection circle center with maximum occurrence times, as the radius of the circle feature.

Figure 12:
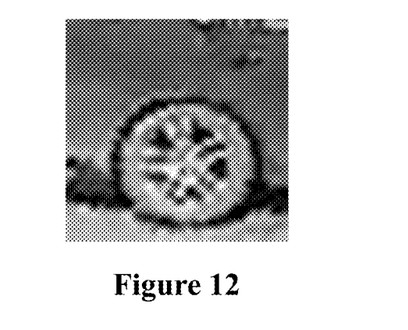
FIG. 12 is a schematic diagram of a subimage including a wheel feature according to an embodiment of the present disclosure.

Reference is made to FIG. 12. First the subfigure including the wheel feature is converted into the greyscale image, and then Sobel filtering is performed on the grayscale image. Through convolutions of Sobel kernels $$A = \begin{Bmatrix} 1 & 0 & -1 \\ 2 & 0 & -2 \\ 1 & 0 & -1 \end{Bmatrix} \text{ and } B = \begin{Bmatrix} 1 & 2 & 1 \\ 0 & 0 & 0 \\ -1 & -2 & -1 \end{Bmatrix}$$

with the grayscale image, the gradient GradX in horizontal coordinate axis direction and the gradient GradY in vertical horizontal coordinate of the grayscale image are obtained respectively, completing Sobel filtering.

Obtained are both the coordinates (x, y) and the gradient direction $\theta = a\tan(GradY/GradX)$ of each pixel of the grayscale image satisfying $\sqrt{GradX^2 + GradY^2} > Thred$ (Thred is a gradient threshold).

Figure 13:
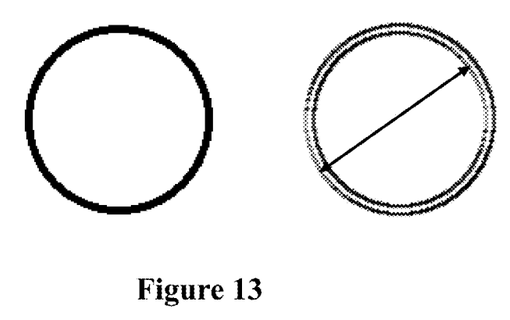
FIG. 13 is a schematic diagram of a symmetry of circle gradient directions according to an embodiment of the present disclosure.

Reference is made to FIG. 13. Taken a perfect circle as an example, a gradient direction diagram on the right of FIG. 13 can be generated from the perfect circle image on the left of FIG. 13, and different gradient directions can be represented by different colors. From FIG. 13, it can be seen that a gradient direction of a certain point on an inner edge of the circle is the same as that of a corresponding point on an outer edge of the circle in 180 degree direction, namely, gradient directions of the circle is symmetric.

According to symmetry of the gradient directions of the circle, a circle center projection can be performed in the gradient direction of the coordinate points satisfying the gradient threshold condition.

Assuming the gradient direction is $\theta$ and the predetermined radius is Ri for a point a(x, y) satisfying the gradient threshold, projection circle centers $o(x_0, y_0)$ of the point a, which corresponds to the gradient direction $\theta$ and the radius Ri, are calculated respectively for different predetermined radii (Ri=R1, R2, ..., Rn). And $x_0=x+Ri*\cos(\theta)$; $y_0=y+Ri*\sin(\theta)$.

In such way, the coordinates of projection circle centers of the coordinate points satisfying the gradient threshold condition, which correspond to different predetermined radii along the gradient direction, can be calculated respectively. The coordinates may be coordinates in the grayscale image.

Figure 14:
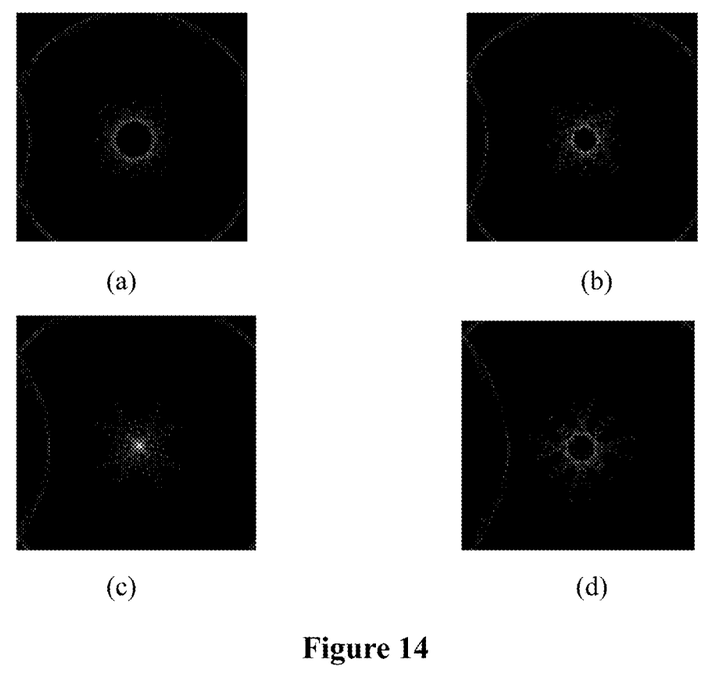
FIG. 14 is a schematic diagram of a circle center projection according to an embodiment of the present disclosure.
Figure 15:
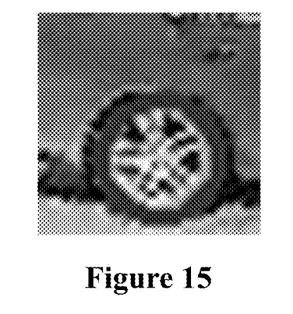
FIG. 15 is a schematic diagram of a circle detection result according to an embodiment of the present disclosure.

Reference is made to FIG. 14, where FIG. 14(a)-(d) corresponds to the projection circle center results corresponding to four predetermined radii R1, R2, R3, and R4, respectively. The circle center projection with a fixed radius reduces dimensionality of a projection space from 3 to 2, reducing complexity of a calculation effectively.

Finally, the coordinates of the projection circle center with the maximum occurrence times are selected as voted circle center coordinates, and a circle is considered to exist in a case that the occurrence times N satisfy $N>2\pi R*0.45$.

As the position of the subimage including the wheel feature in the corrected image is recorded and the above grayscale image is acquired by converting the subimage including the wheel feature in the corrected image, the circle center coordinates in the grayscale image can be converted into the corrected image to acquire the position of the circle center of the circle feature in the corrected image. And the predetermined radius corresponding to the coordinates of the projection circle center with the maximum occurrence times can be considered as the radius of the circle feature.

Finally, an implementing process of step 104 is illustrated.

Figure 16:
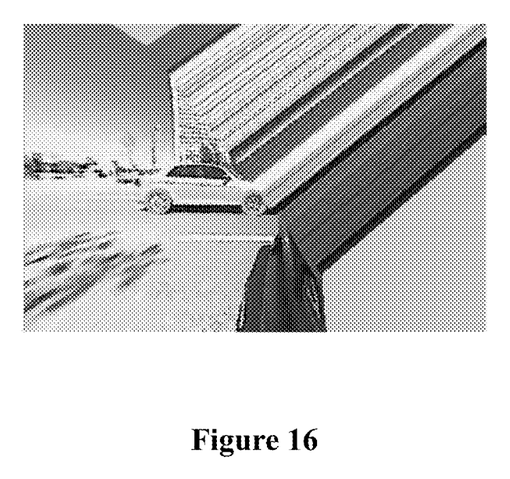
FIG. 16 is a schematic diagram of a side vehicle positioning result according to an embodiment of the present disclosure.

As a plurality of circle detection results are obtained when detecting the same circle, the plurality of the circle detection results can be merged. In a practical application, the circle detection results may be recorded in a circleList (circle list), and matching operation is performed on the circle detection results by searching the circleList. The circle detection results with distances between the circle centers smaller than a predetermined threshold, are merged. The merged circle detection result may be recorded in resultList (result list), and the circle feature in the resultList is considered to be the circle feature finally used for side vehicle positioning. Reference is made to FIG. 16, which shows a schematic diagram of a side vehicle positioning result according to the embodiment of the present disclosure.

Additionally, in the embodiment of the present disclosure, the side vehicle positioning information may be acquired according to multiple frames of original images respectively, the side vehicle is tracked according to the side vehicle positioning information, and a relative velocity between the present vehicle and the side vehicle is acquired.

Namely, in the embodiments of the present disclosure, multiple frames of original images may be acquired in sequence, and the side vehicle positioning information is determined for each frame of the original images through the above method according to the embodiments of the present disclosure. According to the acquisition interval and the position variation of the same circle feature in the world coordinate system, the velocity of the side vehicle and the relative velocity between the present vehicle and the side vehicle can be acquired.

Figure 17:
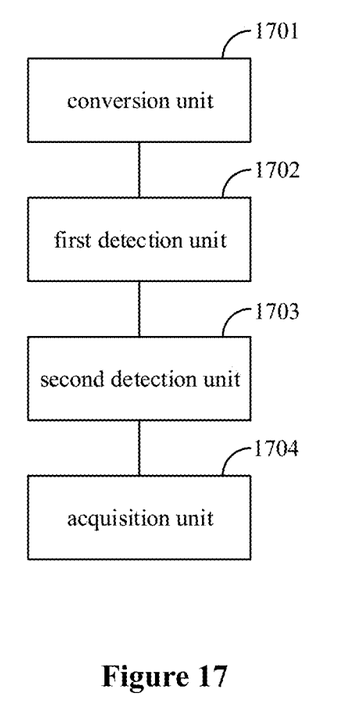
FIG. 17 is a schematic diagram of an apparatus for side vehicle positioning according to an embodiment of the present disclosure.

Reference is made to FIG. 17, which shows an apparatus for side vehicle positioning according to an embodiment of the present disclosure. The apparatus may include:

a conversion unit 1701, configured to convert an original image into a corrected image, where the original image is an image shot by an image acquisition device, and the corrected image is an image under an angle of view of a virtual camera which corresponds to the original image;

a first detection unit 1702, configured to detect a wheel feature in a detection region of the corrected image to acquire a position of a subimage in the corrected image, the subimage including the wheel feature;

a second detection unit 1703, configured to detect a circle feature in the subimage including the wheel feature to acquire a circle detection result, where the circle detection result includes a position of a center of the circle feature in the corrected image and a radius of the circle feature; and an acquisition unit 1704, configured to acquire side vehicle positioning information according to the circle detection result.

In some possible implementations of the embodiment of the present disclosure, the apparatus for side vehicle positioning according to the embodiment of the present disclosure, may further includes:

a tracking unit, configured to acquire the side vehicle positioning information according to multiple frames of original images respectively, track a side vehicle according to the side vehicle positioning information, and acquire a relative velocity between a present vehicle and the side vehicle.

In some possible implementations of the embodiment of the present disclosure, the conversion unit may include:

a first establishment subunit, configured to establish a bijective mapping relationship between positions of pixels in the corrected image and positions of pixels in the original image; and a first mapping subunit, configured to map the original image as the corrected image according to the mapping relationship.

In some possible implementations of the embodiment of the present disclosure, the image acquisition device is a fish-eye camera, and the first establishment subunit may include:

a first calculation subunit, configured to calculate first mapping positions in a coordinate system where the virtual camera is located for the positions of the pixels in the corrected image, according to a mapping relationship between an image coordinate system used by the corrected image and the coordinate system where the virtual camera is located;

a second calculation subunit, configured to calculate second mapping positions in a world coordinate system for the positions of the pixels in the corrected image, according to the first mapping positions and a mapping relationship between the coordinate system where the virtual camera is located and the world coordinate system;

a third calculation subunit, configured to calculate third mapping positions in a coordinate system where the fish-eye camera is located for the positions of the pixels in the corrected image, according to the second mapping positions and a mapping relationship between the world coordinate system and the coordinate system where the fish-eye camera is located;

a fourth calculation subunit, configured to calculate fourth mapping positions in an image coordinate system used by the original image for the positions of the pixels in the corrected image, according to the third mapping positions and a distortion parameter of the fish-eye camera; and a second establishment subunit, configured to establish the bijective mapping relationship between the positions of the pixels in the corrected image and the positions of the pixels in the original image, according to the fourth mapping positions in the image coordinate system used by the original image calculated for the positions of the pixels in the corrected image.

In some possible implementations of the embodiment of the present disclosure, the first detection unit may include:

a second mapping subunit, configured to map a position of a predetermined region in a side lane into the corrected image to acquire detection regions of the corrected image;

a detection subunit, configured to move detection boxes in the detection regions of the corrected image, detect the wheel feature in the detection boxed with a pre-trained wheel classifier, and set a detection box image including the wheel feature as the subimage including the wheel feature; and an acquisition subunit, configured to acquire the position, of the subimage including the wheel feature, in the corrected image.

In some possible implementations of the embodiment of the present disclosure, the second detection unit may include:

a conversion subunit, configured to convert the subimage including the wheel feature into a grayscale image and perform Sobel filtering to acquire gradients of the grayscale image in a horizontal coordinate axis direction and a vertical coordinate axis direction;

a fifth calculation subunit, configured to acquire coordinate points in the grayscale image and calculate gradient directions of the coordinate points, where gradients of the coordinate points in the horizontal coordinate axis direction and the vertical coordinate axis direction satisfy a predetermined condition;

a sixth calculation subunit, configured to calculate, along the gradient directions of the coordinate points satisfying the predetermined condition, coordinates of projection circle centers corresponding to different predetermined radii respectively; and a selection subunit, configured to select coordinates of a projection circle center with maximum occurrence times to be converted into the position of the center of the circle feature in the corrected image, and set a predetermined radius corresponding to the coordinates of the projection circle center with maximum occurrence times, as the radius of the circle feature.

In some possible implementations of the embodiment of the present disclosure, the acquisition unit may be specifically configured to:

merge a plurality of circle detection results, map the position of the center of the circle feature of the merged circle detection result in the corrected image into a world coordinate system to acquire the side vehicle positioning information.

Additionally, a computer readable storage medium is further provided according to an embodiment of the present disclosure. Instructions are stored in the computer readable storage medium, and when the instructions are executed by a terminal device, the terminal device performs the above method for side vehicle positioning according to embodiments of the present disclosure.

A computer program product is further provided according to an embodiment of the present disclosure. When the computer program product is executed by a terminal device, the terminal device performs the above method for side vehicle positioning according to embodiments of the present disclosure.

In such way, according to embodiments of the present disclosure, the original image shot by the image acquisition device is converted into the planar corrected image first. As a wheel in the converted corrected image is close to a perfect circle, it may detect the wheel feature in the corrected image, and then detect the circle feature in the wheel feature. Other vehicles at the sides are accurately positioned through detection of the explicit circle feature, thereby increasing accuracy of side vehicle positioning by a single camera.

It should be noted that, the embodiments of the present disclosure are described in a progressive manner, and each embodiment places emphasis on the difference from other embodiments. Therefore, one embodiment can refer to other embodiments for the same or similar parts. Since the system or the apparatus disclosed in the embodiments correspond to the method disclosed in the embodiments, the description of the system and the apparatus is simple, and reference may be made to the relevant part of the method.

It also should be noted that, in the present disclosure, relationship terms such as first and second is only intended to distinguish an entity or an operation from another entity or another operation, and not necessarily require or indicate that there is any actual relationship or sequence among these entities or operations. Additionally, terms such as "include", "contain" or any other variant are intended to cover a non-exclusive inclusion. Thereby, a process, a method, an object, or a device including a series of elements not only includes those elements, but also includes other elements not explicitly listed, or also includes inherent elements in the process, the method, the object, or the device. In a case that there is no more limitation, an element limited by words "including a . . . " does not exclude another same element existing in a process, a method, an object, or a device including the element.

In conjunction with the embodiments disclosed herein, steps of the described method or algorithm can be implemented by hardware, a software module executed by a processor, or a combination of the above two. The software module may be saved in a random access memory (RAM), an internal memory, a read-only memory (ROM), an electrically programmable ROM, an electrically erasable programmable ROM, a register, a hard disk, a removable hard disk, CD-ROM, or any other conventional form of storage medium in the technical field.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for side vehicle positioning, comprising:
converting an original image into a corrected image, wherein the original image is an image shot by an image acquisition device, and the corrected image is an image under an angle of view of a virtual camera, which corresponds to the original image;
detecting a wheel feature in a detection region of the corrected image to acquire a position of a subimage in the corrected image, wherein the subimage comprises the wheel feature;
detecting a circle feature in the subimage comprising the wheel feature to acquire a circle detection result, wherein the circle detection result comprises a position of a center of the circle feature in the corrected image and a radius of the circle feature; and
acquiring side vehicle positioning information according to the circle detection result, wherein converting the original image into the corrected image comprises:

establishing a bijective mapping relationship between positions of pixels in the corrected image and positions of pixels in the original image; and mapping the original image as the corrected image according to the mapping relationship, wherein, the image acquisition device is a fish-eye camera, and establishing the bijective mapping relationship between the positions of the pixels in the corrected image and the positions of the pixels in the original image, comprises:

calculating first mapping positions in a coordinate system where the virtual camera is located for the positions of the pixels in the corrected image, according to a mapping relationship between an image coordinate system used by the corrected image and the coordinate system where the virtual camera is located;

calculating second mapping positions in a world coordinate system for the positions of the pixels in the corrected image, according to the first mapping positions and a mapping relationship between the coordinate system where the virtual camera is located and the world coordinate system;

calculating third mapping positions in a coordinate system where the fish-eye camera is located for the positions of the pixels in the corrected image, according to the second mapping positions and a mapping relationship between the world coordinate system and the coordinate system where the fish-eye camera is located;

calculating fourth mapping positions in an image coordinate system used by the original image for the positions of the pixels in the corrected image, according to the third mapping positions and a distortion parameter of the fish-eye camera; and establishing the bijective mapping relationship between the positions of the pixels in the corrected image and the positions of the pixels in the original image, according to the fourth mapping positions in the image coordinate system used by the original image calculated for the positions of the pixels in the corrected image.

2. The method according to claim 1, further comprising: acquiring the side vehicle positioning information according to a plurality of frames of original images respectively, tracking a side vehicle according to the side vehicle positioning information, and acquiring a relative velocity between a present vehicle and the side vehicle.

3. The method according to claim 1, wherein, detecting the wheel feature in the detection region of the corrected image to acquire the position of the subimage comprising the wheel feature in the corrected image, comprises:

mapping a position of a predetermined region in a side lane into the corrected image to acquire detection regions of the corrected image;

moving detection boxes in the detection regions of the corrected image, detecting the wheel feature in the detection boxes with a pre-trained wheel classifier, and setting a detection box image comprising the wheel feature as the subimage comprising the wheel feature; and acquiring the position of the subimage comprising the wheel feature in the corrected image.

4. The method according to claim 1, wherein, acquiring side vehicle positioning information according to the circle detection result, comprises: merging a plurality of circle detection results, mapping the position of the center of the circle feature of the merged circle detection result in the corrected image into a world coordinate system to acquire the side vehicle positioning information.

5. An apparatus for side vehicle positioning, comprising:
a memory storing instructions; and
a processor in communication with the memory, wherein, when the processor executes the instructions, the processor is configured to cause the apparatus to:

convert an original image into a corrected image, wherein the original image is an image shot by an image acquisition device, and the corrected image is an image under an angle of view of a virtual camera which corresponds to the original image;

detect a wheel feature in a detection region of the corrected image to acquire a position of a subimage in the corrected image, wherein the subimage comprises the wheel feature;

detect a circle feature in the subimage comprising the wheel feature to acquire a circle detection result, wherein the circle detection result comprises a position of a center of the circle feature in the corrected image and a radius of the circle feature; and acquire side vehicle positioning information according to the circle detection result, wherein converting the original image into the corrected image comprises:

establish a bijective mapping relationship between positions of pixels in the corrected image and positions of pixels in the original image; and map the original image as the corrected image according to the mapping relationship, wherein the image acquisition device is a fish-eye camera, and establishing the bijective mapping relationship between the positions of the pixels in the corrected image and the positions of the pixels in the original image comprises:

calculate first mapping positions in a coordinate system where the virtual camera is located for the positions of the pixels in the corrected image, according to a mapping relationship between an image coordinate system used by the corrected image and the coordinate system where the virtual camera is located;

calculate second mapping positions in a world coordinate system for the positions of the pixels in the corrected image, according to the first mapping positions and a mapping relationship between the coordinate system where the virtual camera is located and the world coordinate system;

calculate third mapping positions in a coordinate system where the fish-eye camera is located for the positions of the pixels in the corrected image, according to the second mapping positions and a mapping relationship between the world coordinate system and the coordinate system where the fish-eye camera is located;

calculate fourth mapping positions in an image coordinate system used by the original image for the positions of the pixels in the corrected image, according to the third mapping positions and a distortion parameter of the fish-eye camera; and establish the bijective mapping relationship between the positions of the pixels in the corrected image and the positions of the pixels in the original image, according to the fourth mapping positions in the image coordinate system used by the original image calculated for the positions of the pixels in the corrected image.

6. The apparatus according to claim 5, wherein, when the processor executes the instructions, the processor is further configured to cause the apparatus to:

acquire the side vehicle positioning information according to a plurality of frames of original images respectively, track a side vehicle according to the side vehicle positioning information, and acquire a relative velocity between a present vehicle and the side vehicle.

7. The apparatus according to claim 5, wherein detecting the wheel feature in the detection region of the corrected image to acquire the position of the subimage in the corrected image comprises:

map a position of a predetermined region in a side lane into the corrected image to acquire detection regions of the corrected image;

move detection boxes in the detection regions of the corrected image, detect the wheel feature in the detection boxes with a pre-trained wheel classifier, and set a detection box image comprising the wheel feature as the subimage comprising the wheel feature; and acquire the position of the subimage comprising the wheel feature in the corrected image.

8. The apparatus according to claim 5, wherein detecting the circle feature in the subimage comprising the wheel feature to acquire the circle detection result comprises:

convert the subimage comprising the wheel feature into a grayscale image and perform Sobel filtering to acquire gradients of the grayscale image in a horizontal coordinate axis direction and a vertical coordinate axis direction;

acquire coordinate points in the grayscale image and calculate gradient directions of the coordinate points, wherein gradients of the coordinate points in the horizontal coordinate axis direction and the vertical coordinate axis direction satisfy a predetermined condition;

calculate, along the gradient directions of the coordinate points satisfying the predetermined condition, coordinates of projection circle centers corresponding to different predetermined radii respectively; and select coordinates of a projection circle center with maximum occurrence times to be converted into the position of the center of the circle feature in the corrected image, and set a predetermined radius corresponding to the coordinates of the projection circle center with maximum occurrence times as the radius of the circle feature.

9. The apparatus according to claim 5, wherein acquiring side vehicle positioning information according to the circle detection result comprises:

merge a plurality of circle detection results, map the position of the center of the circle feature of the merged circle detection result in the corrected image into a world coordinate system to acquire the side vehicle positioning information.

10. A non-transitory computer readable storage medium storing instructions, that when executed by a terminal device, configure the terminal device to execute the method for side vehicle positioning according to claim 1.

11. A method for side vehicle positioning, comprising:

converting an original image into a corrected image, wherein the original image is an image shot by an image acquisition device, and the corrected image is an image under an angle of view of a virtual camera, which corresponds to the original image;

detecting a wheel feature in a detection region of the corrected image to acquire a position of a subimage in the corrected image, wherein the subimage comprises the wheel feature;

detecting a circle feature in the subimage comprising the wheel feature to acquire a circle detection result, wherein the circle detection result comprises a position of a center of the circle feature in the corrected image and a radius of the circle feature; and acquiring side vehicle positioning information according to the circle detection result, wherein, detecting the circle feature in the subimage comprising the wheel feature to acquire the circle detection result, comprises:

converting the subimage comprising the wheel feature into a grayscale image and performing Sobel filtering to acquire gradients of the grayscale image in a horizontal coordinate axis direction and a vertical coordinate axis direction;

acquiring coordinate points in the grayscale image and calculating gradient directions of the coordinate points, wherein gradients of the coordinate points in the horizontal coordinate axis direction and the vertical coordinate axis direction satisfy a predetermined condition;

calculating, along the gradient directions of the coordinate points satisfying the predetermined condition, coordinates of projection circle centers corresponding to different predetermined radii respectively; and selecting coordinates of a projection circle center with maximum occurrence times to be converted into the position of the center of the circle feature in the corrected image, and setting a predetermined radius corresponding to the coordinates of the projection circle center with maximum occurrence times as the radius of the circle feature.

12. A non-transitory computer readable storage medium storing instructions, that when executed by a terminal device, configure the terminal device to execute the method for side vehicle positioning according to claim 11.

* * * * *